United States Patent

Matsuzaki

[11] Patent Number: 5,983,713
[45] Date of Patent: Nov. 16, 1999

[54] SCANNING PROBE MICROSCOPE

[75] Inventor: Ryuichi Matsuzaki, Chiba, Japan

[73] Assignee: Seiko Instruments Inc., Japan

[21] Appl. No.: 09/059,455

[22] Filed: Apr. 13, 1998

[51] Int. Cl.[6] .................................................. G01B 7/34
[52] U.S. Cl. .............................................. 73/105; 250/306
[58] Field of Search ................................ 73/105; 250/306

[56] References Cited

U.S. PATENT DOCUMENTS 5,436,448  7/1995  Hosaka et al. ........................... 250/306
5,623,295  4/1997  Kishi et al. ......................... 250/306 X
5,631,410  5/1997  Kitamura ................................... 73/105
5,805,448  9/1998  Lindsay et al. ..................... 250/306 X

*Primary Examiner*—Daniel S. Larkin
*Attorney, Agent, or Firm*—Adams & Wilks

[57] ABSTRACT

Scanning signals SX and SY produced from a scanning signal-generating portion are directly supplied to a VCM driver amplifier without being attenuated according to the magnification factor. A magnification-setting portion sets the VCM driver amplifier at a magnification factor. A PI control signal produced from a PI control portion is directly supplied to a VCM driver amplifier without being attenuated according to the magnification factor.

3 Claims, 4 Drawing Sheets

MAGNIFICATION SETTING

SCANNING PROBE MICROSCOPE

BACKGROUND OF THE INVENTION

The present invention relates to a scanning probe microscope typified by a scanning atomic force microscope (AFM) and, more particularly, to a scanning probe microscope that provides high noise margin during high-magnification observations and offers observation images with good resolution.

In a scanning probe microscope such as an AFM, microscopic tissues and microstructures on a sample surface are detected by making use of interaction between the sample surface and a scanning probe. For this purpose, a cantilever comprising a cantilever having a probe tip at its front end is used as a scanning probe. Where such a cantilever is employed, when the probe is made to scan the sample surface, an attractive force or repulsive force based on an atomic force is produced between the sample surface and the probe. Accordingly, if this atomic force is detected as an amount of deflection of the cantilever, and if quite slight movement of the sample stage in the Z-direction is so controlled that this amount of deflection is kept constant, i.e., the gap between the sample surface and the probe is retained constant, then the used control signal or the detected amount of deflection itself is representative of the topography of the sample surface.

FIG. 6 is a block diagram showing one example of the structure of the prior art scanning probe microscope. A sample 52 is placed on a sample stage 55. A cantilever 53 has a free end to which a probe 54 is attached. This probe 54 is located above, and opposite to, the sample 52. The amount of deflection of the cantilever 53 is detected by measuring the spot position of laser light 72 emitted from a laser generator 71 and reflected by the back surface of the cantilever 53 with a position detector 73.

The position detector 73 is composed, for example, of four separate light-detecting electrodes. The detector is so aligned that when the amount of deflection of the cantilever 53 is zero, the spot of the laser light 72 is brought to the center of the 4 separate electrodes. Therefore, if the cantilever 53 deflects, the spot of the laser light 72 moves on the 4 separate electrodes. The output signals from the 4 electrodes produce a voltage difference. This voltage difference is amplified by a differential amplifier 74 and applied as a deflection amount signal S1 to the non-inverting input terminal (+) of a operational amplifier 75. A target value-setting portion 79 applies a target value signal regarding the amount of deflection of the cantilever 53 to the inverting input terminal (−) of the operational amplifier 75.

An error signal S2 delivered from the operational amplifier 75 is fed to a proportional-plus-integral-control portion (PI control portion) 76 via a low-pass filter 80. The PI control portion 76 combines the error signal S2 and its integral value and feeds the resulting signal as a PI control signal to a voice coil motor (VCM) driver amplifier 70 and to an observed image signal amplifier 77, the PI control signal acting also as an observed image signal. The VCM driver amplifier 70 produces a driving current, or an exciting current, corresponding to the voltage level of the PI control signal and excites a VCM 81. Thus, the cantilever 53 is made to move a slight distance corresponding to the voltage level of the PI control signal in the Z-direction. The observed image amplifier 77 amplifies the PI control signal by a factor that is specified by a magnification-setting portion 83 and corresponds to the magnification factor in the Z-direction. The amplified signal is supplied as an observed image signal S5 to an image display device (e.g., a CRT) 86.

A scanning signal-generating portion 78 produces XY scanning signals SX and SY to cause the cantilever 53 to move a slight distance in the X- and Y-directions. A magnification control portion 82 attenuates the scanning signals SX and SY by factors that correspond to the magnification factors in the X- and Y-directions, respectively, and are specified by the magnification-setting portion 83. The scanning signals SX and SY attenuated according to the magnification factors are supplied to a VCM driver amplifier 84, which in turn excites a VCM 85 according to the scanning signals SX and SY to drive the cantilever 53 over slight distances in the X- and Y-directions.

The observation magnification factors of the scanning probe microscope in the X- and Y-directions are enlarged by narrowing the range scanned by the probe across the sample surface. In the above-described prior art technique, the magnification control portion 82 attenuates the scanning signals SX and SY according to the magnification factors. The attenuated scanning signals are supplied to the VCM driver amplifier 84 via a scanning line L1, thus narrowing the range scanned.

In addition, with respect to the Z-direction, the scanning probe microscope permits the magnification factor to be set according to the state of the surface of the sample. With the aforementioned prior art technique, if the amplification factor of the PI control signal achieved by the observed image signal amplifier 77 is set high through the magnification-setting portion 83, extension is possible in the Z-direction.

FIG. 5 is a block diagram showing the structure of the prior art VCM driver amplifier 84 about the X- and Y-directions. The scanning signal attenuated by the magnification-setting portion 82 is applied to one differential input terminal of an operational amplifier A1 via the scanning line L1. A current that responds to the voltage level on the scanning line L1 and is amplified according to a reference voltage Vref applied to the other differential input terminal is produced from the output terminal of the operational amplifier A1 and fed to the VCM 85. The output current from the VCM 85 is furnished to a detecting resistor R. The voltage developed across the detecting resistor R is applied to one input terminal of an operational amplifier A2. The output voltage from the operational amplifier A2 is applied as the above-described reference voltage Vref to the other differential input terminal of the operational amplifier A1.

With the prior art technique described above, the voltage level of the scanning signal applied to the operational amplifier A1 decreases with increasing the magnification factor. Therefore, if noise of the same level is introduced in the scanning signal line L1, the ratio of the noise level to the scanning signal level increases with increasing the magnification factor, thus lowering the noise margin. Consequently, if slight noise is introduced in the scanning signal line L1, the resolution is greatly affected adversely.

On the other hand, with respect to the Z-direction, the voltage level of the PI control signal applied to the observed image signal amplifier 77 drops with reducing the unevenness of the sample surface. Therefore, if noise of the same level is introduced in the signal line, the ratio of the noise level to the level of the PI control signal increases with decreasing the unevenness of the sample surface. In consequence, the noise margin drops.

It is an object of the present invention to provide a scanning probe microscope that is free of the foregoing problems, always provides high noise margin irrespective of the magnification factor and the state of the surface of the sample, and enables observation with high resolution.

SUMMARY OF THE INVENTION

The above-described object is achieved in accordance with the teachings of the invention by a scanning probe microscope for bringing a probe close to a surface of a sample and for scanning the probe in X- and Y-directions along the surface of the sample while causing at least one of the probe and the sample to move a slight distance in a Z-direction such that a gap between the surface of the sample and the probe is maintained at a preset value, said scanning probe microscope comprising: XY drive-and-control means for producing XY-driving currents corresponding to said scanning signals about X- and Y-directions; XY fine motion means for causing the probe to move slight distances along the sample surface in the X- and Y-directions in response to said XY-driving currents; a PI control means for providing a proportional-plus-integral-control in response to a signal representative of the gap between the surface of the sample and the probe so as to maintain said gap at a preset value; a means for producing an observed image signal according to a PI control signal; a Z drive-and-control means for producing a Z drive current corresponding to said PI control signal; and a Z fine motion means for causing the probe to move a slight distance in the Z-direction relative to the sample in response to the Z drive current. Said XY drive-and-control means produces XY drive currents that respond to the voltage level of the XY scanning signals and are limited according to magnification factor. The Z drive-and-control means produces a Z drive current that responds to the voltage level of the PI control signal and is limited according to magnification factor.

In the structure described above, the XY scanning signals that are not attenuated irrespective of the magnification factor are directly applied to the XY drive-and-control means. The XY drive-and-control means produce driving signals that are limited according to the magnification factor. Accordingly, this increases the noise margin for the XY scanning signals. In consequence, an observed image is obtained always with high resolution regardless of the magnification factor.

In the structure described above, the Z drive-and-control means produces a drive current that is limited according to the magnification factor. Thus, the slight Z motion is limited. In other words, the slight Z motion relative to the voltage level of the PI control signal decreases with increasing the magnification factor. Therefore, if the unevenness of the sample surface is small, the PI control signal applied to the Z drive-and-control means can be increased. This gives rise to an increase in the noise margin for the PI control signal. As a consequence, an observed image is invariably obtained with high resolution irrespective of the state of the surface of the sample.

DETAILED DESCRIPTION OF THE INVENTION

Figure 1:
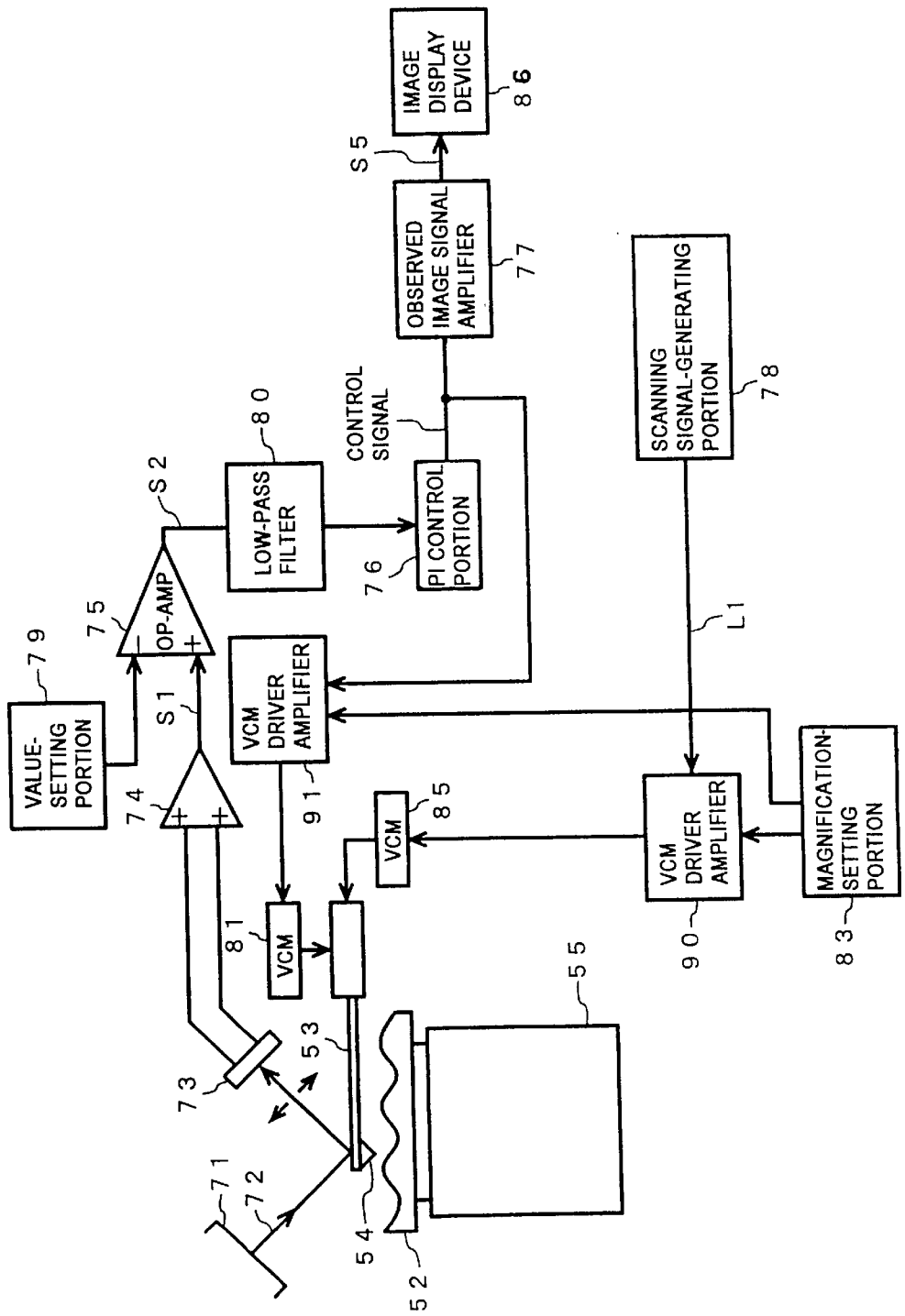
FIG. 1 is a block diagram of a scanning probe microscope to which the invention is applied.

The present invention is hereinafter described with reference to the drawings. FIG. 1 is a block diagram of a signal-processing unit in a scanning probe microscope forming a first embodiment of the present invention. It is to be noted that the same reference numerals as those previously used indicate the same or corresponding parts.

Figure 6:
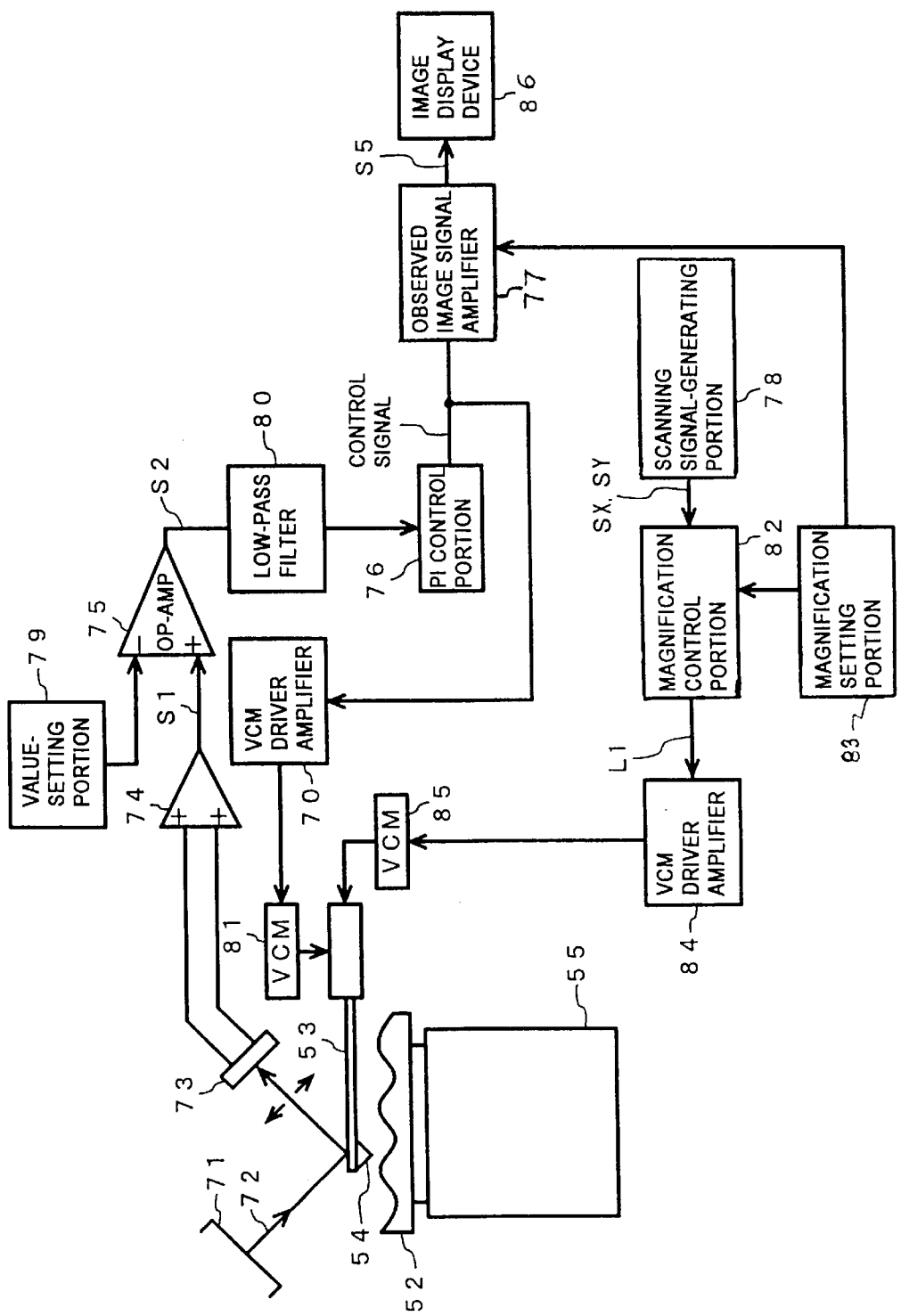
FIG. 6 is a block diagram of the prior art scanning probe microscope.

As can be seen by comparison with the block diagram of the prior art technique described in connection with FIG. 6, the above-described magnification-control portion 82 for attenuating the scanning signals SX and SY is omitted from the present embodiment. In the present embodiment, the scanning signals SX and SY produced from the scanning signal-generating portion 78 are directly applied to the VCM driver amplifier 90 without being attenuated according to the magnification factor. The magnification-setting portion 83 sets the VCM driver amplifier 90 at a magnification factor.

In addition, in the present embodiment, modification of the amplification factor of the PI control signal by the observed image signal amplifier 77 in response to an instruction from the magnification-setting portion 83 is omitted. The magnification-setting portion 83 is characterized in that it sets the VCM driver amplifier 91 at a magnification factor.

Figure 2:
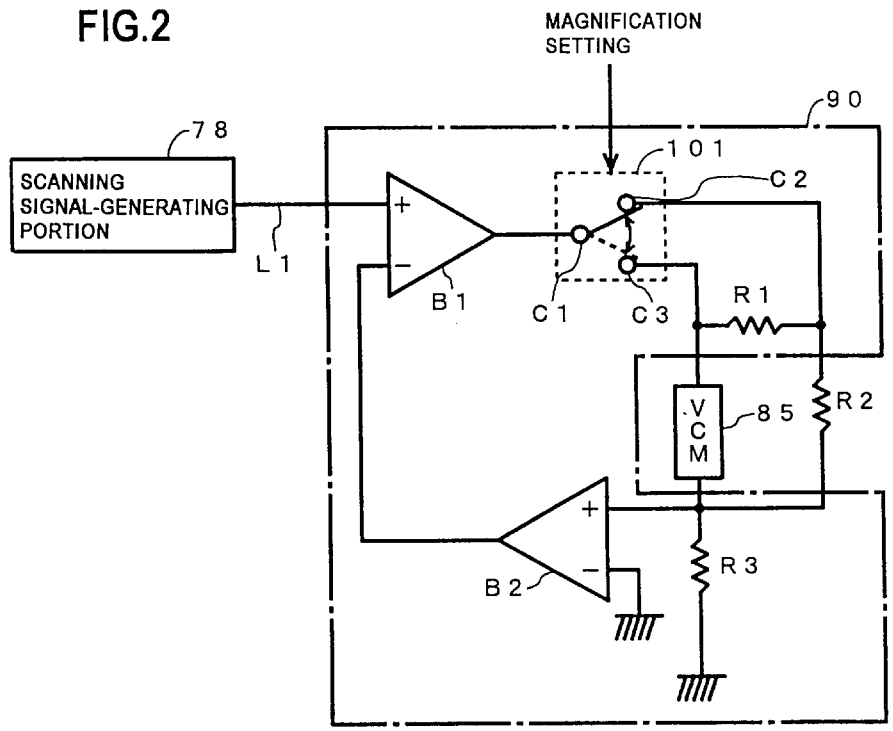
FIG. 2 is a block diagram of a first embodiment of a VCM driver amplifier.

FIG. 2 is a block diagram showing the structure of the first embodiment of the above-described VCM driver amplifier 90. The same numerals as those used previously denote the same or corresponding parts. In the present embodiment, the scanning signals SX and SY produced from the scanning signal-generating portion 78 are directly applied to one differential input terminal of an operational amplifier B1 via the scanning line L1 without being attenuated regardless of the magnification factor. The output terminal of the operational amplifier B1 is connected with a movable contact c1 of a switch 101. One fixed contact c2 of the switch 101 is connected to one end of each of resistors R1 and R2. The other fixed contact c3 is connected with the other end of the resistor R1 and with one end of the VCM 85. The other ends of the resistor R2 and of the VCM are connected with one differential input terminal of the operational amplifier B2, together with one end of a resistor R3. The output terminal of the operational amplifier B2 is connected with the other differential input terminal of the operational amplifier B1.

In this structure, the contact of the switch 101 is switched by a magnification-setting signal produced from the magnification-setting portion 83. When the movable contact c1 is connected with one fixed contact c2, the output current from the operational amplifier B1 is divided between a path going into the resistor R3 via both resistor R1 and VCM 85 and a path going into the resistor R3 only via the resistor R2. When the movable contact c1 is connected with the other fixed contact c3, the output current from the operational amplifier B1 is divided between a path going into the resistor R3 via the resistors R1 and R2 and a path going into the resistor R3 via the VCM 85.

Accordingly, the amount of current supplied to the VCM 85 varies, depending on whether the movable contact c1 is connected with the fixed contact c2 or c3, by appropriately selecting the resistance values of the resistors R1 and R2 according to the resistance value of the VCM 85. As a result, a driving current that responds to the scanning signal and is reduced according to the magnification factor is fed to the VCM 85. The observation magnification factor can be increased.

For instance, we now consider the case in which the VCM 85 and the resistor R2 have a resistance value of R, the resistor R1 has a resistance value of 9R, and an electric current I flows into the resistor R3. If the movable contact c1 is connected with the fixed contact c2, currents of I·1/11 and I·10/11 flow into the VCM 85 and the resistor R2, respectively. On the other hand, when the movable contact c1 is connected with the fixed contact c3, currents of I·10/11 and I·1/11 flow into the VCM 85 and the resistor R2, respectively. Therefore, the current flowing into the VCM 85 is one tenth of the current when the movable contact c1 is connected with the fixed contact c2 compared with the case where the contact 1 is connected with the fixed contact c3. Hence, the magnification factor is 10.

In this way, according to the present embodiment, the amount of current supplied into the VCM 85 can be controlled according to the magnification factor without attenuating the scanning signal applied to the operational amplifier B1 via the scanning line L1. Accordingly, the noise margin for the scanning line L1 is increased. An observation image with high resolution is obtained, irrespective of the magnification factor. As the magnification factor increases, the amount of current supplied to the VCM 85 decreases. However, effect of noise can be neglected, because the VCM 85 is energized with current.

Figure 3:
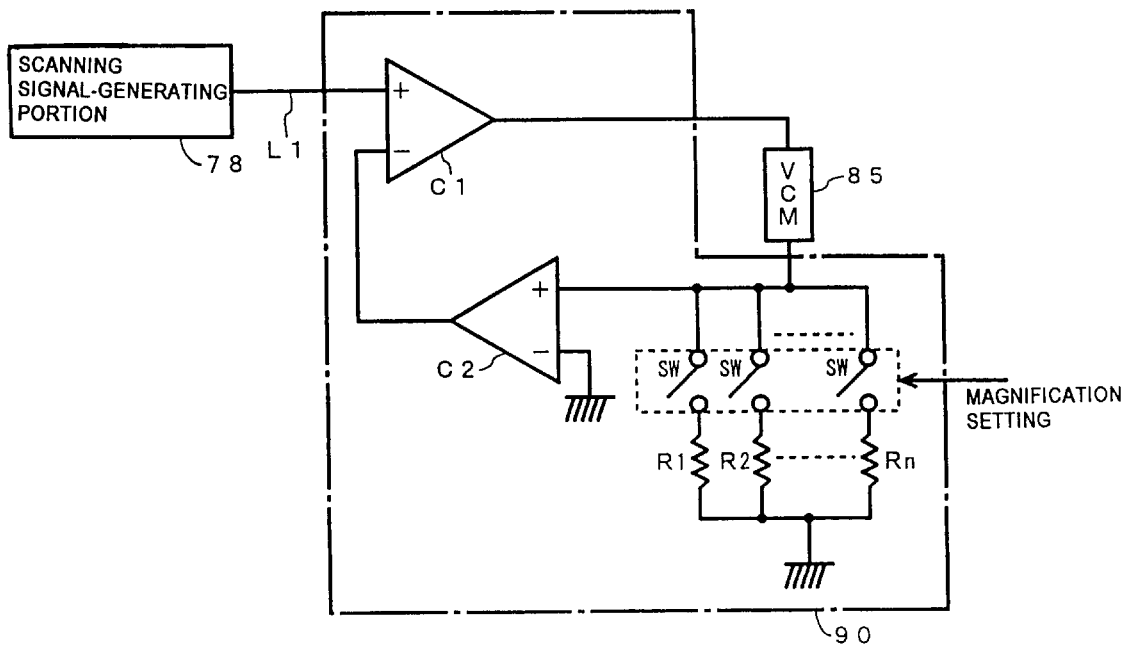
FIG. 3 is a block diagram of a second embodiment of the VCM driver amplifier.

FIG. 3 is a block diagram of another example of structure of the above-described VCM driver amplifier 90. The same symbols as those used previously indicate the same or corresponding parts. Scanning signals SX and SY produced from the scanning signal-generating portion 78 are directly applied to one differential input terminal of the operational amplifier C1 without being attenuated also in the present embodiment. The output current from the operational amplifier C1 is applied to one end of the VCM 85, the other end being connected with one differential input terminal of an operational amplifier C2. The output terminal of the operational amplifier C2 is connected with the other differential input terminal of the operational amplifier C1.

Plural switches SW have their contacts opened and closed by a magnification-setting signal produced from the magnification-setting portion 83. One end of each of these switches SW is commonly connected with the other end of the VCM 85. Resistors R1, R2 . . . Rn having different resistance values are connected in series with the other end described above. The other end of each resistor is connected with a fixed potential (ground potential in the present embodiment).

In this structure, when appropriate switch SW is opened or closed by the magnification-setting signal produced from the magnification-setting portion 83, the voltage applied to one differential input terminal of the operational amplifier C2 varies, depending on the opened or closed switch SW or on a combination of the actuated switches. This changes the output voltage from the operational amplifier C2. In response to this, the gain of the operational amplifier C1 varies. As a result, a driving current that responds to the scanning signal and is reduced according to the magnification factor is supplied to the VCM 85. In consequence, the observation magnification factor can be increased.

In this way, even in the present embodiment, the amount of current supplied to the VCM 85 can be controlled according to the magnification factor without attenuating the scanning signal applied to the operational amplifier C1 via the scanning line L1. Therefore, an observation image with high resolution is derived, independent of the magnification factor.

Figure 4:
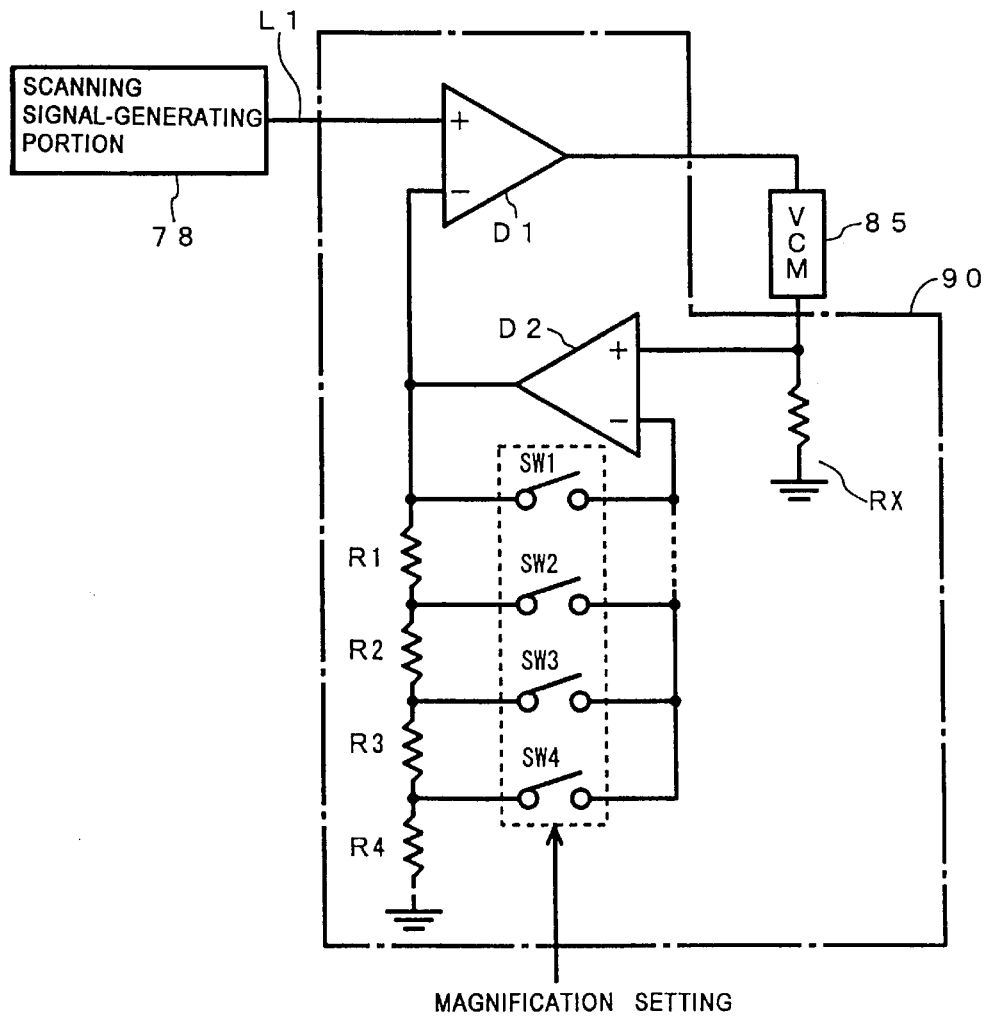
FIG. 4 is a block diagram of a third embodiment of the VCM driver amplifier.
Figure 5:
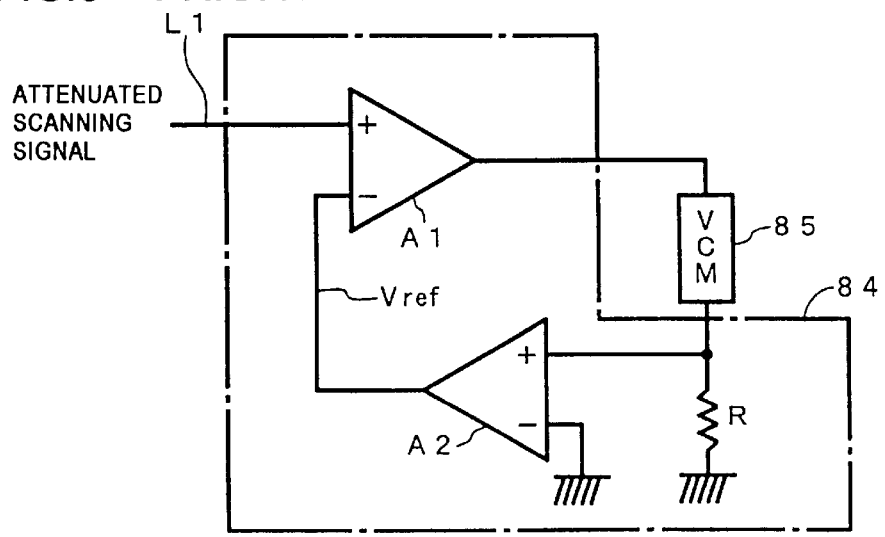
FIG. 5 is a block diagram of a third embodiment of the prior art VCM driver amplifier.

FIG. 4 is a block diagram showing a further example of structure of the above-described VCM driver amplifier 90. The same symbols as those employed previously indicate the same or corresponding parts. The scanning signals SX and SY produced from the scanning signal-generating portion 78 are directly applied to one differential input terminal of an operational amplifier D1 without being attenuated also in the present embodiment. The output current from the operational amplifier D1 is applied to one end of the VCM 85, the other and being connected with one differential input terminal of an operational amplifier D2 and with one end of a detecting resistor Rx.

The output terminal of the operational amplifier D2 is tied to the other differential input terminal of the operational amplifier D1. Voltage-dividing resistors R1, R2 . . . Rn are connected in series between the output terminal and ground. The junctions of the resistors are connected with the other differential input terminal of the operational amplifier D2 via switches SW1, SW2 . . . SWn.

In this structure, when appropriate switch SW is opened or closed by the magnification-specifying signal produced from the magnification-setting portion 83, the voltage applied to one differential input terminal of the operational amplifier D2 varies, depending on the opened or closed switch SW or on a combination of the actuated switches. This results in a change in the feedback gain owing to the operational amplifier D2. In response to this, the gain of the operational amplifier D1 varies. As a result, a driving current that responds to the scanning signal and is reduced according to the magnification factor is supplied to the VCM 85. The observation magnification factor can be extended.

In this way, even in the present embodiment, the amount of current supplied into the VCM 85 can be controlled according to the magnification factor without attenuating the scanning signal applied to the operational amplifier D1 via the scanning line L1. An observation image with high resolution is obtained, irrespective of the magnification factor.

In the description of the embodiments above, the present invention is applied to scanning in the X- and Y-directions. With respect to the Z-direction, the amount of slight movement in the Z-direction is reduced by designing the structure in such a way that as the magnification factor increases, the energizing current supplied to the VCM 81 from the VCM driver amplifier 91 is more limited. To compensate for this, the PI control signal increases. Therefore, the noise margin for the PI control signal fed to the VCM driver amplifier 91 increases. An observation image faithfully representing surface topography is obtained.

The present invention makes it possible to control the amount of current supplied to the VCM according to the magnification factor without attenuating the signal applied to the VCM driver amplifier. Consequently, an observation image with high resolution can be always obtained, irrespective of the magnification factor or the surface topography.

What is claimed is:

1. A scanning probe microscope for bringing a probe close to a surface of a sample and for scanning the probe in X- and Y- directions along the surface of the sample while causing at least one of the probe and the sample to move a slight distance in a Z-direction such that a gap between the surface of the sample and the probe is maintained at a preset value, said scanning probe microscope comprising:

a scanning signal-generating means for generating scanning signals for the X- and Y-directions;

an XY drive-and-control means for producing XY-driving currents corresponding to said scanning signals;

current-driven XY fine motion means supplied with said XY-driving currents and acting to move the probe a slight distance on the surface of the sample in the X- and Y-directions;

a PI control means for providing a proportional-plus-integral-control in response to a signal representative of the gap between the surface of the sample and the probe to maintain said gap at a preset value;

a means for producing an observed image signal according to a PI control signal;

a Z drive-and-control means for producing a Z driving current corresponding to said PI control signal;

a current-driven Z fine motion means supplied with said Z driving current and acting to cause the probe to move a slight distance relative to the sample in the Z-direction; and at least one of said XY drive-and-control means and said Z drive-and-control means responding to a voltage level of said scanning signals or of said PI control signal and producing driving currents limited according to a magnification factor.

2. The scanning probe microscope set forth in claim 1, wherein each of said drive-and-control means comprises voltage/current conversion means for producing a current in response to the voltage level of said scanning signals or of said PI control signal; and a current-proportioning means for dividing said output current into two currents according to a ratio corresponding to said magnification factor and for supplying the two currents to said fine motion means.

3. The scanning probe microscope set forth in claim 1, wherein each of said drive-and-control means comprises voltage/current conversion means for producing currents in response to the voltage level of said scanning signals or of said PI control signal; and gain control means for controlling gains of said voltage/current conversion means according to said magnification factor.

\* \* \* \* \*